(12) United States Patent
Zimmerman

(10) Patent No.: US 12,414,538 B2
(45) Date of Patent: *Sep. 16, 2025

(54) LIFTING HARNESS FOR AN ANIMAL INCLUDING CHEST AND HIP UNITS INTERCONNECTED BY A TETHER

(71) Applicant: PAW ACQUISITION I CORP., Denver, CO (US)

(72) Inventor: Cary D. Zimmerman, Denver, CO (US)

(*) Notice: Subject to any disclaimer, the term of this patent is extended or adjusted under 35 U.S.C. 154(b) by 131 days.

This patent is subject to a terminal disclaimer.

(21) Appl. No.: 17/961,256

(22) Filed: Oct. 6, 2022

(65) Prior Publication Data

US 2023/0036154 A1    Feb. 2, 2023

Related U.S. Application Data

(63) Continuation of application No. 15/966,725, filed on Apr. 30, 2018, now Pat. No. 11,464,201, which is a continuation of application No. 15/139,150, filed on Apr. 26, 2016, now Pat. No. 9,955,668, which is a continuation of application No. 14/329,657, filed on Jul. 11, 2014, now Pat. No. 9,320,260, which is a continuation-in-part of application No. 13/724,837, filed on Dec. 21, 2012, now abandoned, which is a continuation of application No. 11/467,460, filed on Aug. 25, 2006, now Pat. No. 8,336,506.

(Continued)

(51) Int. Cl.
*A01K 1/02*      (2006.01)
*A01K 27/00*    (2006.01)

(52) U.S. Cl.
CPC .......... *A01K 1/0263* (2013.01); *A01K 27/002* (2013.01); *A01K 27/003* (2013.01)

(58) Field of Classification Search
CPC ... A01K 1/0263; A01K 27/002; A01K 27/003
USPC ........................................... 119/725
See application file for complete search history.

(56) References Cited

U.S. PATENT DOCUMENTS

| | | |
|---|---|---|
| 440,887 A | 11/1890 | Springsteen |
| 4,768,650 A | 9/1988 | Chancellor, Jr. |

(Continued)

FOREIGN PATENT DOCUMENTS

| | | |
|---|---|---|
| DE | 8204815 | 2/1983 |
| GB | 2448768 | 10/2008 |

(Continued)

OTHER PUBLICATIONS

Extended European Search Report for European Patent Application No. 15176552.6, dated Feb. 25, 2016, 9 pages.

(Continued)

*Primary Examiner* — Brady W Frazier
(74) *Attorney, Agent, or Firm* — Sheridan Ross P.C.

(57) ABSTRACT

An animal lifting device and method is provided. In particular, a hip member and a chest member are provided that have handles thereon. The chest member and the hip member may be selectively interconnected to each other with an interconnection member. The chest member may include an upper portion, shoulder pads, a chest pad, a center cross member, and an adjustable strap. The hip member may include an upper portion, an adjustable sling, and adjustable straps.

20 Claims, 8 Drawing Sheets

Related U.S. Application Data

(60) Provisional application No. 60/711,970, filed on Aug. 26, 2005.

(56) References Cited

U.S. PATENT DOCUMENTS

| | | | |
|---|---|---|---|
| 5,305,710 | A | 4/1994 | Ward, Jr. |
| 5,531,187 | A | 7/1996 | Ward |
| 5,738,043 | A | 4/1998 | Manuel |
| 5,775,970 | A | 7/1998 | Klees et al. |
| 5,845,606 | A | 12/1998 | Hartman |
| 5,894,817 | A | 4/1999 | Manuel |
| 5,896,831 | A | 4/1999 | Alpert |
| 6,101,979 | A | 8/2000 | Wilson et al. |
| 6,123,049 | A | 9/2000 | Slater |
| 6,161,505 | A | 12/2000 | Noguero |
| 6,363,697 | B1 | 4/2002 | Shapiro |
| 6,543,390 | B2 | 4/2003 | Lowery |
| 6,662,755 | B2 | 12/2003 | Kato |
| 6,729,268 | B1 | 5/2004 | Costell |
| 6,802,282 | B2 | 10/2004 | Muckleroy |
| 6,880,489 | B2 | 4/2005 | Hartmann et al. |
| 6,912,976 | B2 | 7/2005 | Everett |
| 7,004,114 | B2 | 2/2006 | Hippensteel |
| 7,044,087 | B1 | 5/2006 | Brecheen |
| 7,107,940 | B2 | 9/2006 | Abinanti |
| 7,284,504 | B1 | 10/2007 | Purschwitz, Jr. et al. |
| 7,353,779 | B2 | 4/2008 | Altieri |
| 8,336,506 | B2 | 12/2012 | Zimmerman |
| 8,869,751 | B2 | 10/2014 | Ben Yosef et al. |
| 9,320,260 | B2 | 4/2016 | Zimmerman |
| 9,955,668 | B2 | 5/2018 | Zimmerman |
| 11,464,201 | B2 | 10/2022 | Zimmerman |
| 2003/0221634 | A1 | 12/2003 | Emerick |
| 2005/0045687 | A1 | 3/2005 | Willows et al. |
| 2005/0263102 | A1 | 12/2005 | Sherman et al. |
| 2007/0012261 | A1* | 1/2007 | Altieri .................... A01K 1/029 119/770 |
| 2007/0012263 | A1 | 1/2007 | Hammonds |
| 2007/0113798 | A1 | 5/2007 | Torjesen |
| 2008/0276880 | A1 | 11/2008 | Swisher et al. |
| 2010/0282808 | A1 | 11/2010 | Debnam et al. |
| 2013/0180470 | A1 | 7/2013 | Zimmerman |
| 2013/0213319 | A1* | 8/2013 | Hoffman .............. A01K 1/0263 119/792 |

FOREIGN PATENT DOCUMENTS

| | | |
|---|---|---|
| JP | 2003245025 | 9/2003 |
| WO | WO 99/11494 | 3/1999 |

OTHER PUBLICATIONS

Official Action for U.S. Appl. No. 11/467,460 mailed Jun. 12, 2009, 5 pages. Restriction Requirement.

Official Action for U.S. Appl. No. 11/467,460 mailed Feb. 19, 2010, 15 pages.

Official Action for U.S. Appl. No. 11/467,460 mailed Aug. 31, 2010, 12 pages.

Official Action for U.S. Appl. No. 11/467,460 mailed Mar. 27, 2012, 13 pages.

Notice of Allowance for U.S. Appl. No. 11/467,460 mailed Sep. 17, 2012, 8 pages.

Official Action for U.S. Appl. No. 13/724,837, mailed Jul. 24, 2013 13 pages.

Final Action for U.S. Appl. No. 13/724,837, mailed Jan. 15, 2014 16 pages.

Official Action for U.S. Appl. No. 14/329,657, mailed Jun. 29, 2015 16 pages.

Notice of Allowance for U.S. Appl. No. 14/329,657, mailed Dec. 10, 2025 9 pages.

Notice of Allowance for U.S. Appl. No. 14/329,657, mailed Mar. 29, 2016 2 pages.

Official Action for U.S. Appl. No. 15/139,150, mailed Jan. 9, 2017 25 pages.

Final Action for U.S. Appl. No. 15/139,150, mailed Jun. 26, 2017 24 pages.

Notice of Allowance for U.S. Appl. No. 15/139,150, mailed Dec. 29, 2017 10 pages.

Official Action for U.S. Appl. No. 15/966,725, dated Jan. 12, 2021, 5 pages. Restriction Requirement.

Official Action for U.S. Appl. No. 15/966,725, dated Mar. 26, 2021, 20 pages.

Official Action for U.S. Appl. No. 15/966,725, dated Jan. 5, 2022, 16 pages.

Notice of Allowance for U.S. Appl. No. 15/966,725, dated Jun. 10, 2022, 10 pages.

Corrected Notice of Allowance for U.S. Appl. No. 15/966,725, dated Jul. 1, 2022, 6 pages.

* cited by examiner

LIFTING HARNESS FOR AN ANIMAL INCLUDING CHEST AND HIP UNITS INTERCONNECTED BY A TETHER

CROSS REFERENCE TO RELATED APPLICATIONS

This Application is a Continuation of U.S. patent application Ser. No. 15/966,725, filed Apr. 30, 2018, and issued as U.S. Pat. No. 11,464,201, which is a Continuation of U.S. patent application Ser. No. 15/139,150, filed Apr. 26, 2016, and issued as U.S. Pat. No. 9,955,668, which is a Continuation of U.S. patent application Ser. No. 14/329,657, filed Jul. 11, 2014, and issued as U.S. Pat. No. 9,320,260, which is a Continuation-in-Part of U.S. patent application Ser. No. 13/724,837, filed Dec. 21, 2012, which is a Continuation of U.S. patent application Ser. No. 11/467,460, filed Aug. 25, 2006 and issued as U.S. Pat. No. 8,336,506, which is a Non-Provisional Application of and claims the benefit of U.S. Provisional Application No. 60/711,970, filed Aug. 26, 2005, the entire disclosures of which are incorporated herein by reference, and the benefit of priority of which are claimed herewith.

FIELD OF THE INVENTION

The present invention relates to an animal-lifting harness and, more specifically, the harness includes a chest portion and/or a hip portion that allows a user to lift or restrain an animal.

BACKGROUND OF THE INVENTION

As dogs and other pets begin to age so do their limbs, joints and muscles. It is not uncommon for animals to develop arthritis in their joints, specifically their hips or shoulders. Activities that were once easy for an animal to participate in become a chore or impossible. One of the most difficult activities for an animal suffering from these conditions is for them to get up after sitting down. Other activities that become cumbersome are walking up and down stairs, going for a daily walk, or entering/exiting a vehicle.

Presently, there are only a few solutions that generally address these particular problems. One of the current solutions at present are ramps that assist pets in getting in and out of vehicles. These ramps only partially assist the animals, for instance a dog, in that the dog must still cover the elevation between the ground and the vehicle to get in. They also are typically designed such that the dog uses them under their own power. It is awkward and somewhat dangerous for owners to attempt in assisting the dog into the vehicle. There are also bridges which may allow a dog to walk over a fence. Both of the above mentioned solutions have limitations in that they need to be transported along with the dog.

There also exist general animal lifting solutions known that veterinarians or the like may utilize. These devices are designed to be used as a temporary lifting aid. Some known solutions include a sling connected to a handgrip, a rolled up towel placed under the animal, or a rope. These lifting/assisting apparatuses cannot be worn by an animal through the duration of a day. They also cannot be used while the animal is in motion. For example, it is not comfortable for the animal to wear the device during a walk and therefore the owner cannot assist the animal during that activity if the need arises.

SUMMARY OF THE INVENTION

It is thus one aspect of the present invention to provide an innovative harness which helps support and lift an animal. Also, some dogs tend to have problems with only their hips. Their upper body can fully support itself but their lower body is where more assistance is needed. In fact, the hips of dogs tend to deteriorate more quickly than do their shoulders. Therefore, a harness that only supports the upper body of the animal will not address the real source of the animal's problems, which could be their hips. In particular, in one embodiment of the present invention the animal harness comprises a chest unit and a hip unit. The hip unit wraps around the hind quarters of a dog underneath the pet's pelvis. The hip unit can have a buckle, latch, button, snap or any other connecting devices known in the art that will allow the harness to be selectively secured and released from the animal's hind quarters. In addition to the harness that runs underneath the lower torso of the animal a padded sling can be used to secure the hip unit in place around the animal. The padded sling may be adjustable and can be selectively secured to the hip unit by hook and loop material, buttons, snaps, and/or another selective securing devices known. The hip unit is also held in place with two adjustable straps that keep the harness from sliding forward up the animal's torso. The straps are adjustable for any size of animal and can be made of elastic, nylon, or leather. If the material of the adjustable straps is elastic in nature, additional adjustment devices may not be necessary. However, if the adjustable straps are made of a less stretchy material they can be adjusted by a series of buckles and rings. The selectively adjustable straps can be attached to the hip unit via d-rings, buckles, hook and loop material, etc.

It is also an aspect of the present invention to provide a chest unit for the harness. In one embodiment, the chest unit comprises an adjustable strap, shoulder pads, a chest pad and a cross member that is adjustable. The cross member interconnects with the shoulder pads across the front of the animal's shoulders. The shoulder pads run up and across the shoulders to the top of the chest unit. The shoulder pads have additional padding within them to provide additional comfort to the animal during use. The cross member runs underneath the animal's chest and connects to the adjustable strap that is secured behind the animal's legs around the torso. The cross member may also be padded for further comfort of the animal. It is an object of the present invention to provide as much comfort to the animal as possible such that continuous use during activity is possible. The adjustable strap wraps around the animal's torso and secures the top of the chest unit. The adjustable strap may be selectively secured to the chest unit by the same devices as the adjustable straps of the hip unit.

The chest unit and hip unit have multiple adjustable straps so that both units may be worn by the animal comfortably for an extended period of time. The adjustable straps also allow the harness to be worn by animals of varying sizes. It also provides room for adjustment if the same animal grows or shrinks.

An additional connection member such as a d-ring or loop of material is connected to least one of the chest unit and hip unit. In one embodiment, the connection member is located on the top of the chest and/or hip unit. This connection member allows the user to selectively connect a leash or any other restraint to the chest and/or hip unit.

In yet another embodiment, the connection member is a series of connecting latches or buckles. These connecting members could span the circumference of the animal's stomach to ensure the harnesses are securely in place. Further, in still another embodiment, the connection member can be a conformable, mesh-like material that is continuous or semi-continuous around the pet's stomach. A continuous connection device that is breathable and light weight allows the pet freedom of motion, all the while maintaining the position of the chest and hip members.

The additional connection member(s) serve another function in the present invention. It is also desirable to have an animal restraint system for use when the animal is traveling in a vehicle. Often pets like to ride with their heads hanging out of the window of the vehicle, and this can be a serious safety concern. If pets are left to roam about the cab of a car or the bed of a truck freely, they risk injuring themselves and their owners.

One aspect of the present invention relates to a restraining device to keep pets in a fixed location while traveling in a vehicle. In one embodiment, a harness is adapted for restraining not only the upper torso of the animal, e.g. and around the shoulder area, but also their rear-ends, such that the dog's hind quarters are not free to move around, thus precluding the lower half of the pet susceptible to injury. Restraint devices can be selectively attached to the connection member(s) while the animal is in a vehicle. The restraint devices are functional to restrain both the upper body of the animal via the chest unit and the lower body of the animal via the hip unit. The restraint of an animal during transport serves to protect the animal in the case of an accident. It also prevents the animal from roaming around the vehicle at their leisure which may cause a distraction to the driver thus resulting in an accident. To be able to secure the hips and chest is advantageous because the animal is secured at two points on their body and will therefore be much safer during transport.

In a further embodiment, a harness handle is located on top of the chest and/or hip unit. The harness handle provides a point(s) from which an owner of the animal may lift the animal. The harness(es) also allows the user to assist their pet while the pet is walking or performing some other activity where the pet cannot fully support their own weight. In a preferred embodiment, both the hip and chest unit have a handle. This allows the user to easily lift or assist their pet from two points, thereby evening the load of the animal. Having two points from which to lift also allows two users to assist lifting an animal, rather than one having to do it all.

In yet another embodiment of the present invention, a connecting strap runs from the hip unit to the chest unit, thereby securing the hip unit in place. The connecting strap prevents the hip unit from slipping down the torso of the animal. One skilled in the art will appreciate that a plurality of connecting straps can be used instead of a single connecting strap. Also, with the connecting strap running from the hip unit to the chest unit and the adjustable elastic straps running around the back legs of the animal, the hip harness does not slide out of position. The adjustable straps on the hip unit prevent it from sliding forward while the connecting strap stops any backward motion of the hip unit.

In an alternative configuration, a fairly simple attachment (e.g., loop of material, set of buckles, etc.) loops through the chest and hip handles. The attachment is adapted to interface with a vehicle or animal carrying case such that the attachment secures the chest and hip harness, which in turn secures the animal wearing the chest and hip harness during transport.

In another aspect of the present invention, reflectors can be placed on the hip and/or chest harness or any of the adjustable straps to insure visibility of the animal during twilight or night hours. There could also be compartments or pockets on either the chest or hip harness that would allow the user to place certain items in them for the animal to carry themselves. Items might include the animal's leash, a portable water bowl, or keys to a vehicle. The pockets can be integral to the chest or hip harness (i.e., pockets stitched into the materials). Alternatively, the pockets could be saddlebags that can be selectively attached to the chest and/or hip harness.

The saddlebags can be attached by know methods including hook and loop material, buckles, fasteners, or the like.

Another unique aspect of the present invention is that both the hip and chest harness are designed to be worn full-time and not just as a momentary lifting apparatus. They are designed such that a animal is allowed to have freedom of motion and can thereby enjoy a walk through the park or along a trail with their owner. The harnesses allow the user to continually assist the animal, if need be, for instance if an animal cannot make the entire walk under their own power, the owner of the animal could assist by lifting either the handle on the chest or the hip harness relieving some of the body weight of the animal from their legs.

This Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

BRIEF DESCRIPTION OF THE DRAWINGS

The accompanying drawings which are incorporated herein and constitute a part of the specification, illustrate various embodiments of numerous inventions and together with the general description of the invention given provide the detailed description, and the drawings serve to explain the principles of these embodiments.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
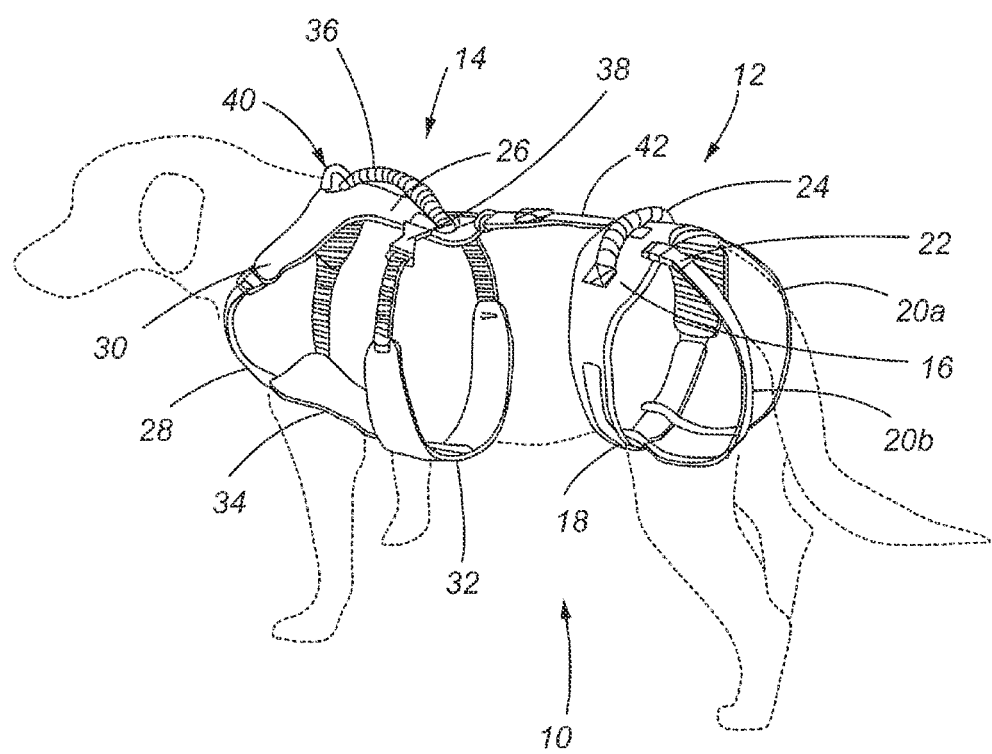
FIG. 1 depicts a particular embodiment of a dog in the present invention.
Figure 2A:
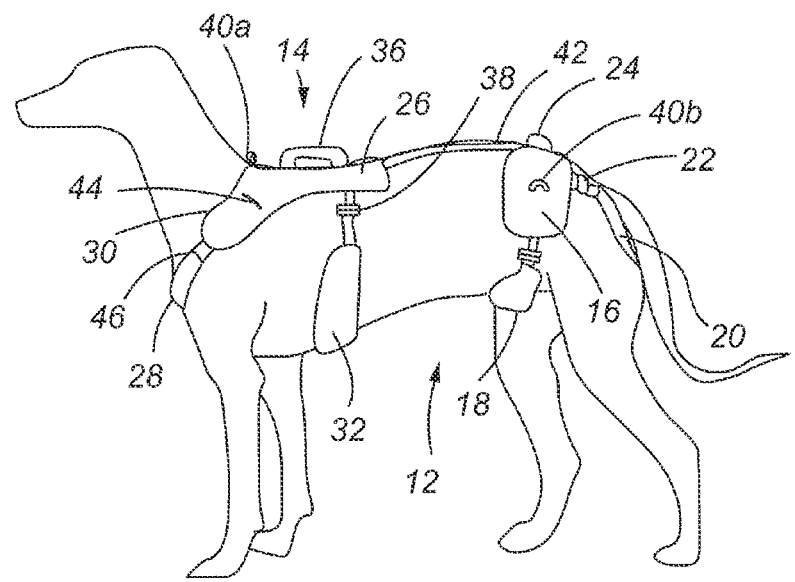
FIG. 2a is a side view depicting another embodiment of the present invention.
Figure 2B:
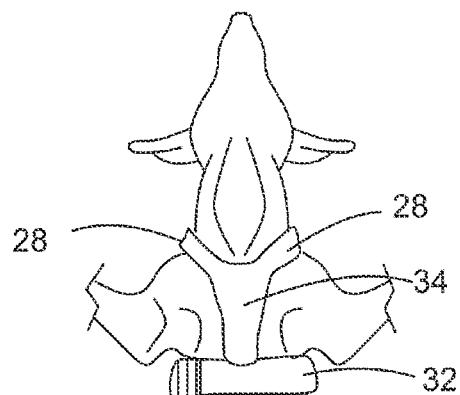
FIG. 2b is a bottom view depicting yet another embodiment of the present invention.
Figure 2B:
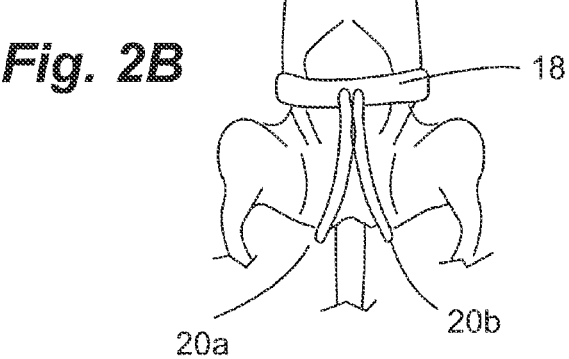

Referring to FIGS. 1, 2a, and 2b, an embodiment of the animal's lifting harness 10 is shown on a dog. More specifically, the lifting harness 10 includes a hip unit 12 and a chest unit 14. The hip and chest unit 12 and 14 are adapted to receive and be secured to an animal's hip and chest respectively. In one embodiment of the present invention, the hip unit 12 has an upper portion 16 and can be padded for comfort. There is also an adjustable padded sling 18 that runs underneath the animal selectively securing the hip harness to the animal's torso. The padded sling 18 can be selectively secured to the upper portion of the hip unit 16 by hook and loop material, buttons, snaps, latches, buckles, or any other securing devices well known in the art. The padded sling 16 is adjustable to accommodate animals of various sizes. The padding on the sling also ensures that the hip unit 12 can be worn for an extended period of time without the animal experiencing discomfort. The selective securability of the sling also allows the user to easily put on and remove the hip unit 12 as it is desired.

In a particular embodiment, there are also two adjustable straps, a first adjustable strap 20a and a second adjustable strap 20b, that selectively engage the upper portion of the hip unit 16 and the padded sling 18 underneath the animal. The adjustable straps can be secured to the top portion of the hip unit 16 and/or the padded sling 18 with securing mechanisms 22 including, d-rings and latches, buttons, hook and loop material, buckles, snap fasteners, etc. Each adjustable strap 20a and 20b secures to the top portion 16 and wraps underneath a rear leg of a four legged animal. The straps are then secured to the adjustable sling 18. These adjustable straps 20a and 20b run underneath each hind leg of the animal and provide further support and securement for the hip unit 12. Because the adjustable straps 20a and 20b wrap around the hind quarters of the animal and can be secured to top portion 16 and padded sling 18, the hip unit 12 is prevented from slipping up the animal.

In another embodiment, the adjustable straps 20a and 20b can be loops of material that are adjustable in length. The loops can be constructed as is described in U.S. Pat. No. 6,729,268 to Costell. Unlike Costell however, the loops are separate entities that may be selectively secured to at least one of the padded sling 18 and upper portion of the hip unit 16. For example, one end of the material can be selectively secured to the upper portion of the hip unit 16. The loops can then wrap around the hind legs of the animal. The other ends of the straps can be selectively secured to the upper portion of the hip unit 16 as well.

In still another embodiment, adjustable straps may not be necessary. If the padded sling 18 provides adequate securement of the hip portion to the animal then no additional straps may be needed. The animal will enjoy more comfort if fewer straps are used.

The adjustable straps 20a and 20b may be made of an elastic material that can adjust by itself. The straps 20a and 20b can also be a less elastic material but may include a combination of latches, buckles, rings, etc. to facilitate adjustment. Also, the straps can be elastic and include the additional hardware listed above for added adjustment and comfort.

In one embodiment of the present invention, a handle 24 is supplied on the hip unit 12. The handle 24 facilitates assisting the animal in a variety of activities including, getting up out of a seated or laid down position, into or out of a vehicle, running, jumping, sitting, standing, laying down, or for simple assistance while the animal is walking. The hip unit handle 24 may be fixedly secured to the hip unit 12 by stitching or glue. However, the hip unit handle may also be selectively secured to the upper portion of the hip unit by buckles, snaps, or latches. In a preferred configuration, the hip handle 24 is located on the top portion of the hip unit 16. Alternatively, the handle 24 or a plurality of handles may be placed anywhere on the hip unit 12. For example, two handles may be placed on opposite sides of the hip unit 12.

The animal harness 10 may also include a chest unit 14. In one embodiment, the chest unit 14 includes an upper portion 26, chest pads 28, shoulder pads 30, an adjustable strap 32, and a cross member 34. The upper portion of the chest unit 26 is connected to the chest pads 28 by the shoulder pads 30. The shoulder pads span across the top of the animal's shoulders.

Additional padding may be supplied in both the chest pads 28 and shoulder pads 30 to provide comfort to the animal during use. The padding can be inserted into the shoulder pads 30 or chest pad 28 through inserts provided 44 and 46 respectively. The inserts are designed to receive the padding even if the harness is still on the animal. The chest pad 28 is then interconnected to the cross member 34 that runs underneath the chest of the animal to the adjustable strap 32 that is wrapped around the upper torso of the animal behind their front legs. The adjustable strap 32 is selectively secured to the upper portion of the chest unit 26 by a fastening member 38 that can be a hook and loop material, buttons, snaps, latches, or any other securing mechanism. The cross member 34 and shoulder pads 30 are also adjustable like the adjustable straps on the hip and chest units 12 and 14 and the padded sling 16 to accommodate animals of various sizes. All adjustable members may be made of a conformable elastic material and/or may have buckles, latches, rings or other adjustment devices that help adjust the straps to the appropriate size. In one embodiment, the chest harness can also incorporate a member that is adapted to receive a human hand 36. The member adapted to receive a human hand 36 may be a handle, loop of material, or any other device that would allow a user to assist an animal in a given activity. The chest unit handle 36 may be fixedly secured to the chest unit 14 by stitching or glue. However, the chest unit handle 36 may also be selectively secured to the upper portion of the chest unit 26 by buckles, snaps, or latches. In a preferred configuration, the chest handle 36 is located on the top portion of the chest unit 26. Alternatively, the handle may be a plurality of handles that are placed anywhere on the chest unit 14. For example, two handles may be placed on opposite sides of the chest unit 14.

In a preferred embodiment handles are provided on both the hip and chest units 12 and 14. With two handles available to lift the animal from the user can maintain the balance of the animal more easily. Also, two handles allow two people to assist a larger animal without getting in each other's way. Lifting by just the hips or just the chest would have the owner lift the animal from an unbalanced position. By being able to lift from both the chest and hips independently, the owner is able to lift the animal in a balanced position and therefore keep the animal more comfortable. Having two points from which to lift also makes it easier for the owner to lift the animal. Furthermore, if only one part of the animal needs assistance, the user can selectively use the handle that is necessary. For instance, if only the hips on a dog are bad the user only needs to lift the dog by the hip unit handle 34 and does not have to bother with the chest unit handle 36. Likewise, the chest unit handle 36 may only be necessary to assist a dog on a daily walk once they are up and moving.

Another embodiment provides selectively detachable handles and members for receiving the detachable handles on both the hip and chest members. This feature allows the user to attach the handle(s) to at least one of the chest and hip member only when the animal requires assistance. Whenever the animal does not need their owners assistance, the handles can be removed. For example, lifting assistance may only be necessary when the animal needs to get in and out of a vehicle. The owner may selectively secure the handles to the chest 14 and/or hip unit 12 to assist the animal at the vehicle then may detach them and leave them in the vehicle while both the owner and their pet go on an afternoon walk. The owner and pet are not burdened with the handles when they are not necessary.

In a further embodiment of the present invention additional restraint connectors 40 are supplied on the top portion of the chest unit 26 and/or the hip unit 16 allowing the user to connect a leash or any other restraint device to the animal. These restraint connectors 40 can be a d-ring, snaps, buttons, hook and loop material, or any other restraining member known in the art. These connection devices 40 can provide a plurality of points of restraint for an animal while they are in a vehicle or out on a walk in the park.

In one embodiment of the present invention, the restraint connectors 40 on either the chest harness or the hip harness can facilitate the securing of an animal to an external object. For instance, if a user has to go to the restroom and cannot take the animal into the bathroom with them then the animal can be secured to a tree by a leash and the leash can be connected to the chest or hip unit 14 or 12 by the connection member 40. Alternatively, the animal can be secured to the bed of a truck or the inside of a vehicle by the connection members 40 such that during transport the animal can be secured not only by their chest, but by their hips. Reference is made to U.S. Pat. No. 6,543,390 wherein attachments are provided to secure an animal in a moving vehicle. When an animal is secured by the hips and chest they are much safer than if they were only secured by one or the other.

Another embodiment of the current invention includes an adjustable connecting strap. This connecting strap runs between the chest unit 14 and the hip unit 12. The connecting strap 42 provides a way of securing the hip harness 12 in place along with the elastic straps 20a and 20b that run underneath the hind legs of the animal. The hip harness 12 is secured from moving either forward or backward on the animal.

It is understood to one skilled in the art that the hip harness 12 could simply be used alone or the chest harness 14 could be simply used alone. If it is the hips that are bothering the animal, then a user can elect to use just the hip portion of the harness 12. The hip harness 12 would facilitate lifting only the part of the animal that is injured and would not burden the animal with excess materials while it is walking. Likewise, the chest portion 14 could be used without the hip portion 12 if it is the animal's shoulders that frequently give the animal trouble and do not allow the animal to be as active as it would like. However, in a preferred embodiment the hip harness 12 and chest harness 14 are used in combination to provide multiple points of assistance for an owner of the animal.

Figure 3:
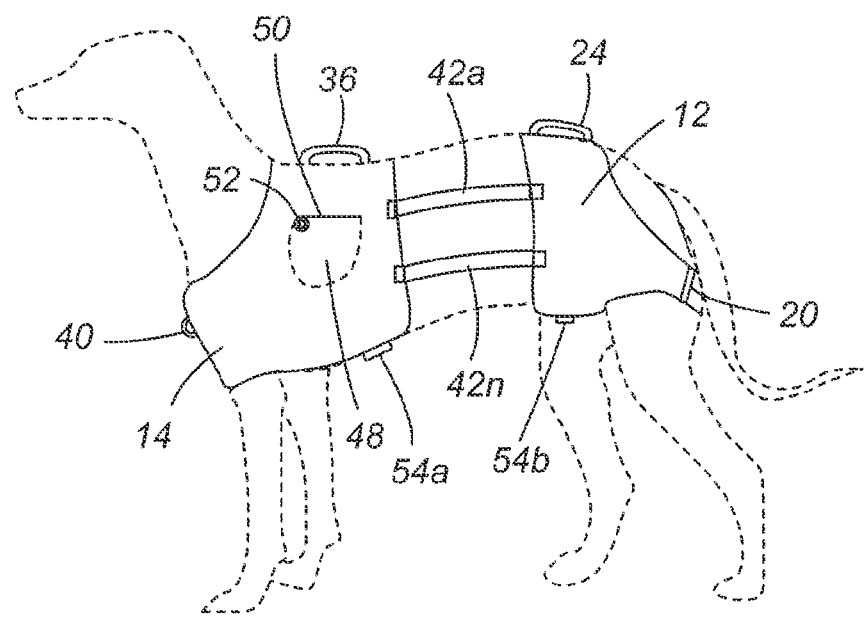
FIG. 3 is a side view depicting another embodiment of the present invention.

Referring now to FIG. 3, a further embodiment of the present invention is depicted. The previously described connection member 42 is now a plurality of connection members 42a-n. Multiple connection members or connecting devices provide for further stability of the front and back harnesses. Also, a selectively closeable pocket 48 is provided on at least one of the front harness and back harness. The pocket 48 is selectively opened and closed by a zipper 50 which is engaged by a closure pull 52. The pockets 48 or other storage members are included in the hip harness and/or the chest harness. In one configuration, the pockets 48 are pieces of material stitched into the chest and/or hip unit. These pockets would allow the user to put personal items in the harness. For instance, the animal's leash, a portable water bowl, or keys can be carried in the harness if the owner has no pockets to carry them.

The pockets 48 can also be saddle bags or other enclosure members that are external to, but adapted for use with, the lifting harness 10. The external enclosure members can interface with just the chest unit 14 or just the hip unit 12 or may interface with both simultaneously thereby increasing the support between the hip and chest unit 12 and 14. The external enclosure members can be connected to the hip unit 12 or chest unit 14 by hook and loop material, buckles, snap fasteners, buttons, d-rings and latches, etc.

The chest unit 14 and hip unit 12 are each one piece adjustable members in another embodiment of the present invention. The adjustable straps and padded sling 16 that span the underside of the animal can be eliminated by providing a one piece chest unit 14 and a one piece hip unit 12. The harness size can be adjusted by using the adjusting member 20 on the hip unit 12. Both the hip unit 12 and chest unit 14 may also be adjustable by cinching members 54a and 54b located on the hip and chest unit 12 and 14.

Also depicted in an alternative embodiment, the restraint connector 40 is located on the underside of the animal. The restraint connector 40 is located on at least one of the hip and chest unit 12 and 14. It may be desirable to have the restraint connector 40 underneath the animal if the only place to secure the animal in a vehicle is on the floor. By having the restraint connector 40 underneath the animal, a leash or restraint doesn't have to cross the body of the animal thereby eliminating the risk of becoming strangled by the leash.

Alternatively, an attachment that loops through the top and bottom handles of the chest and hip harness can be used to restrain the animal. The attachment may be a loop of material or a couple pieces of material. The handles may interface with the attachments by buckles, buttons, snap fasteners or the like. Having a separate attachment allows the user of the present invention to leave the attachment in the vehicle where it will be used, rather than carrying it with the animal wherever the chest and hip harness go.

Figure 4:
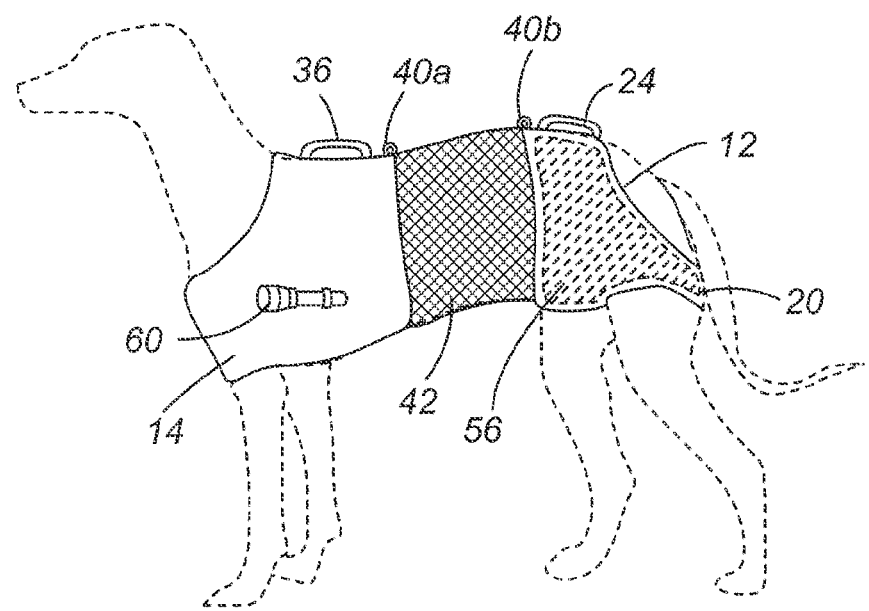
FIG. 4 is a side view depicting still another embodiment of the present invention.

Referring now to FIG. 4, in another embodiment both harnesses and straps are covered in reflective materials 56. These reflective materials 56 will ensure that the animal is noticeable by a driver or any other passerby during the twilight or dark hours. Likewise, the chest 14 and hip unit 12 can be made of a reflective material rather than being covered in reflective materials.

In another embodiment the connection member 42 is a mesh-like material that conforms to the body of the animal. The connection member spans the circumference of the animal along with the hip and chest units 12 and 14. The connection member is selectively securable to both the hip and chest unit 12 and 14 and provides full interconnectivity between the hip and chest unit 12 and 14.

In an embodiment of the invention, a securing member(s) 58 is attached to the chest unit 14. The securing member(s) 58 can be selectively connected to the chest member by buttons, snaps, clasps, etc. In one embodiment, the securing member(s) are adapted to receive a flashlight 60 to help view a dark area.

It is an advantage of the invention that the units are padded at multiple points on the animal. The padding helps to increase the comfort of the animal and therefore the animal can wear the hip and chest unit 12 and 14 for extended periods of time. The fact that these harnesses are designed to be worn on a full-time basis allows the user to assist their animal while they are on a walk and doesn't burden the animal or the owner with having to continually put on and take off the harnesses for lifting the animal in and out of a car if they are going for a walk.

Referring again to FIGS. 1-4, a brief description of a method of manufacturing one embodiment of the present invention is shown and described. More specifically, one skilled in the art will appreciate that the harness as described herein may be constructed of a rigid or a compliant material depending on the desires of the individual. Compliant materials such as leather, koskin, rubber, nylon, alone or in combination with selectively placed members for rigidity may be employed. Rigid materials such as plastics, cardboard, etc. may be employed either alone or in combination with the previously described compliant materials. In addition, one skilled in the art will appreciate that common manufacturing techniques, such as sewing, heat welding, etc. may be employed to fabricate embodiments of the present invention as described herein.

Figure 5:
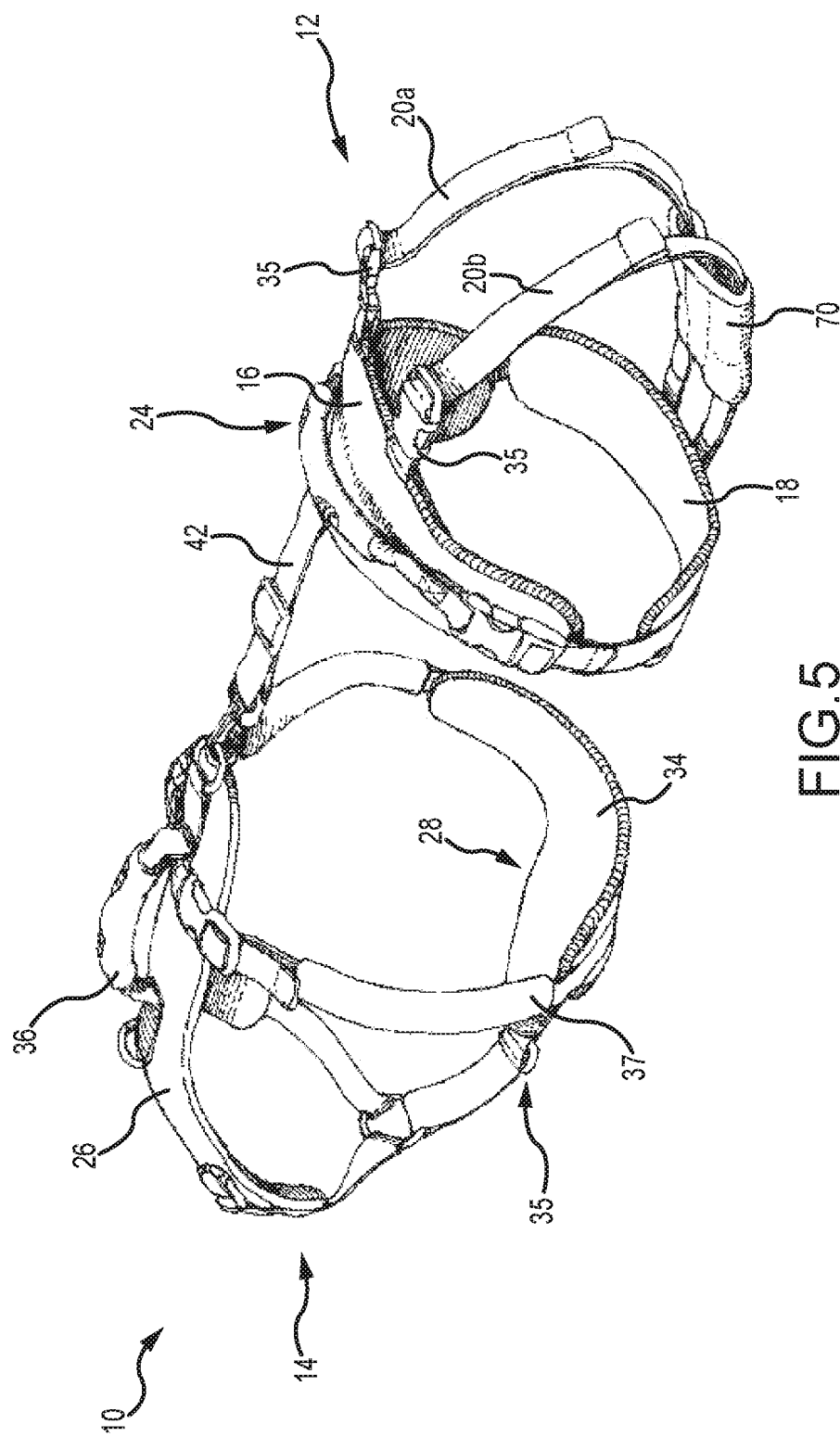
FIG. 5 is a rear perspective view of a harness according to one embodiment of the present invention.

FIG. 5 is a perspective view of a harness 10 according to one embodiment of the present invention. More specifically, the lifting harness 10 includes a hip unit 12 and a chest unit 14. The hip and chest unit 12 and 14 are adapted to receive and be secured to an animal's hip and chest respectively. In one embodiment of the present invention, the hip unit 12 has an upper portion 16 and can be padded for comfort. There is also an adjustable padded sling 18 that runs underneath the animal selectively securing the hip harness to the animal's torso. The padded sling 18 can be selectively secured to the upper portion of the hip unit 16 by hook and loop material, buttons, snaps, latches, buckles, or any other securing devices well known in the art. The padded sling 16 is adjustable to accommodate animals of various sizes. The padding on the sling also ensures that the hip unit 12 can be worn for an extended period of time without the animal experiencing discomfort. The selective securability of the sling also allows the user to easily put on and remove the hip unit 12 as it is desired.

In a particular embodiment, there are also two adjustable straps 20a and 20b that selectively engage the upper portion of the hip unit 16 and the padded sling 18 underneath the animal. The adjustable straps can be secured to the top portion of the hip unit 16 and/or the padded sling 18 with securing mechanisms 22 including, d-rings and latches, buttons, hook and loop material, buckles, snap fasteners, etc. Each adjustable strap 20a and 20b secures to the top portion 16 and wraps underneath a rear leg of a four legged animal. The straps are then secured to the adjustable sling 18. These adjustable straps 20a and 20b run underneath each hind leg of the animal and provide further support and securement for the hip unit 12. Because the adjustable straps 20a and 20b wrap around the hind quarters of the animal and can be secured to top portion 16 and padded sling 18, the hip unit 12 is prevented from slipping up the animal.

As also shown in FIG. 5, a padded securing strap 70 is provided and is secured around at least one of and preferably both of the adjustable straps 20a, 20b. In certain embodiments, the adjustable straps 20a, 20b comprise tapered nylon straps lined with neoprene. In various embodiments, the securing strap 70 comprises a padded member with a hook and loop closure to allow the padded member to be passed, encircled or wrapped around both adjustable straps 20a, 20b and secured back onto itself. Preferably, the securing strap 70 encircles the straps 20a, 20b and is oriented substantially perpendicular to the straps 20a, 20b. In such embodiments, the securing strap 70 helps retain the straps 20a, 20b in a proximal position relative to each other and to prevent the straps 20a, 20b from splaying or spreading apart and causing discomfort or injury to the animal. Such spreading of the straps is known to place undue stress upon an animal's hips. Accordingly, to prevent this condition, the securing strap 70 is provided to stabilize the relative position of the straps 20a, 20b. Additionally, the securing strap 70 increases the surface area of the harness that contacts an animal, thereby reducing pressure on the animal during lifting operations. In various embodiments, the securing strap 70 is fully removable and adjustable. Specifically, the strap 70 may be wrapped around the straps 20a, 20b and the wrapping is sufficient to secure the strap in a preferred orientation and position with respect to the straps 20a, 20b, for example. Alternatively, a strap 70 is provided that is secured (e.g. stitched, welded, or bonded) to at least one of the straps 20a, 20b to retain the strap 70 in a preferred position, such as may be desirable or comfortable for a particular size of animal.

As shown in FIG. 5, the handles 24, 36 comprise a soft polypropylene material (or similar) to assist a user in lifting the animal. Additionally, various adjustment members 35 are provided on various portions of the device. Adjustment member may comprise FASTEX Fasteners, for example. Padded sleeves 37 are further provided for encircling the animal and providing enhanced comfort.

Figure 6:
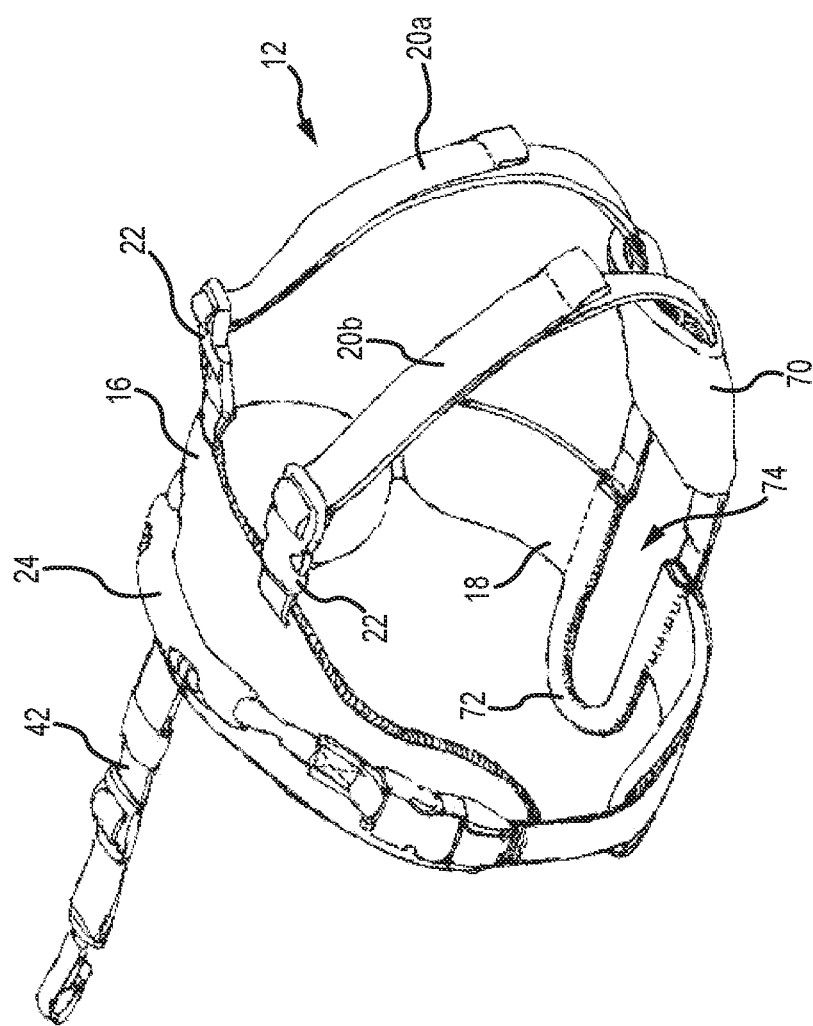
FIG. 6 is a rear perspective view of a harness device according to one embodiment of the present invention.

FIG. 6 is a perspective view of a rear portion 12 of a harness 10 according to one embodiment of the present invention. As shown, the rear portion 12 comprises various features of hip lift harnesses shown and described herein, including a top portion 16 with a padded sling 18 and strap members 20a, 20b. As further shown in FIG. 6, the harness 10 comprises a sling 18 for extending underneath an animal, the sling comprising a U-shaped member 72 proximal a central portion and/or connecting two portions of the sling 18. The U-shaped member 72 preferably comprises an at least partially rigid member open at a rearward portion of the harness 10 and/or animal (not shown in FIG. 6). The U-shaped member 72 thus creates a void space 74 which is particularly well-suited for male animals. The void space 74 provided by the U-shaped member 72 accommodates the penis of a male animal, and is also suitable for female animals. Embodiments of the present invention are contemplated for use with elderly animals, which may have problems with physical mobility. Accordingly, users (animals and humans alike) benefit from the void space 74 provided by embodiments of the present invention, wherein an animal may urinate and/or be supported while urinating without the need to remove the harness 10. Indeed, it is contemplated that it may be preferable to keep the device 10 in place while such functions are performed. The embodiment of FIG. 6 is well suited for assisting older and/or mobility-impaired animals. For example, the padded sling 70, the U-shaped member 72 and the void space 74 enable unrestricted urination and defecation. Additionally, the additional features of the device 10 such as the handles 24, 36 allow a human to support an animal during such bodily functions. In certain embodiments, the U-shaped member 72 comprises a metal, such as a steel member that is preferably coated with a fabric, textile, foam, or similarly soft material to provide comfort to the animal. In certain embodiments, the U-shaped member 72 comprises an at least partially deformable member with a memory, such that the U-shaped member 72 and internal void space 74 defined by the member 72 may be selectively adjusted to accommodate an animal's specific dimensions. Additionally, the padded strap 70 maintains the straps 20a, 20b in a preferred lateral position to increase comfort and reduce undesired stressed on the animal's hip(s).

Figure 7:
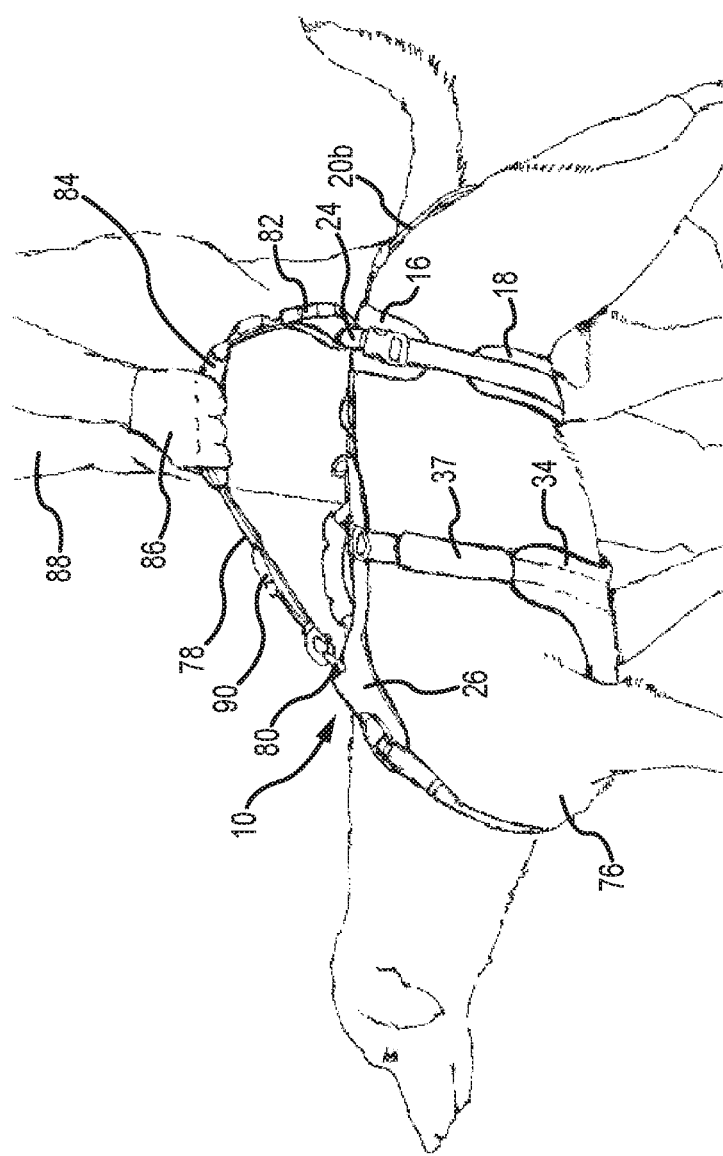
FIG. 7 is a side elevation view of a harness in a state of use and according to one embodiment of the present invention.

FIG. 7 is a side elevation view of a harness 10 provided on an animal 76 for illustrative purposes. A selectively adjustable tether 78 is provided in FIG. 7. The tether member 78 comprises a multi-function device that is selectively interconnected to harnesses of various embodiments and/or to harnesses known in the art and not-yet developed. The tether 78 is suitable for use with a wide number of harnesses for animals and similar devices, but is shown in FIG. 7 as being selectively connected to a harness 10 of the present invention. A first end of the tether 78 comprises a clip or clasp suitable selective interconnection to a portion of the harness 10, such as a D-ring 80 provided on a forward portion of the device 10. A second end of the tether 78 is looped around an existing handle 24 of the harness 10 and secured back to a length of the tether 78 by a buckle 82 and/or clasp. Disposed along the length of the tether 78 and between the first end and the second end is a handle portion 84 adapted to receive the hand 86 of a user 88. The tether 78 also comprises an adjustment member 90 provided on the length and suitable for adjusting the length of the tether 78. Accordingly, tethers 78 of the present invention comprise a length that is adjustable by a user and convertible between a short-leash and a longer shoulder strap member. Additionally, the tether 78 may be removed from the harness 10 at the second end and used as a standard leash wherein only the first end of the tether 78 is secured to a forward portion of the device 10.

In the embodiment and position shown in FIG. 7, the tether 78 is suitable for guiding and supporting an animal. Specifically, the tether 78 as shown and described in FIG. 7, is provided as both a leash and a support member, wherein the length of the tether 78 and position of the handle 84 are provided to lift and support at least a portion of the front and rear ends of the animal.

Figure 8:
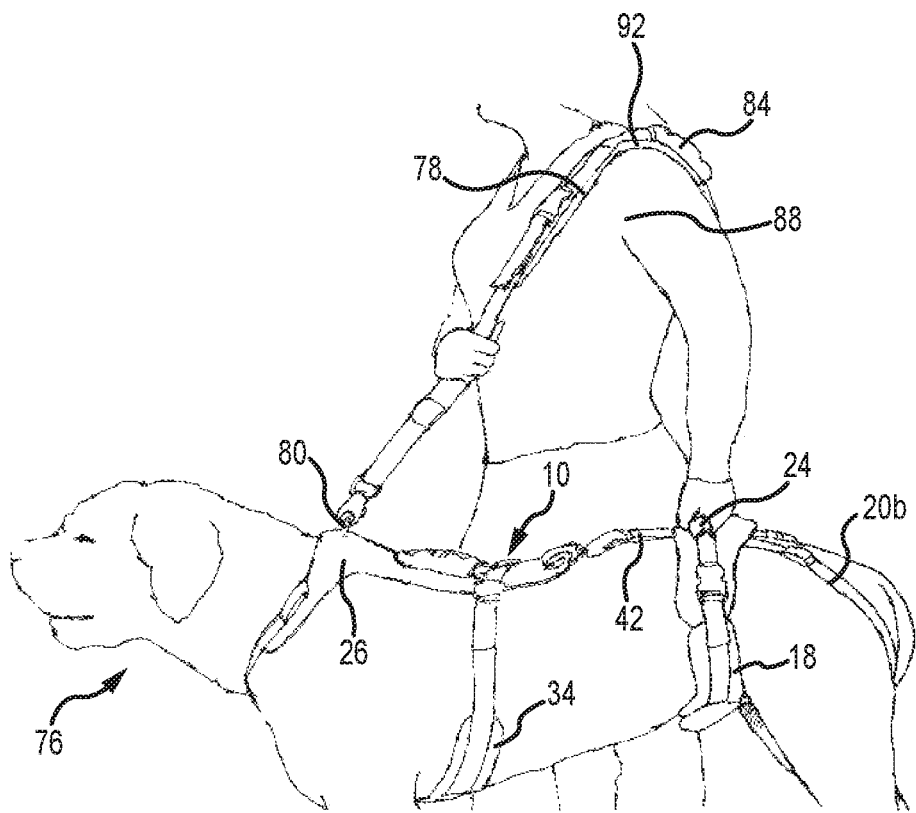
FIG. 8 is a side elevation view of the embodiment of FIG. 7 in a second state of use.
Figure 9:
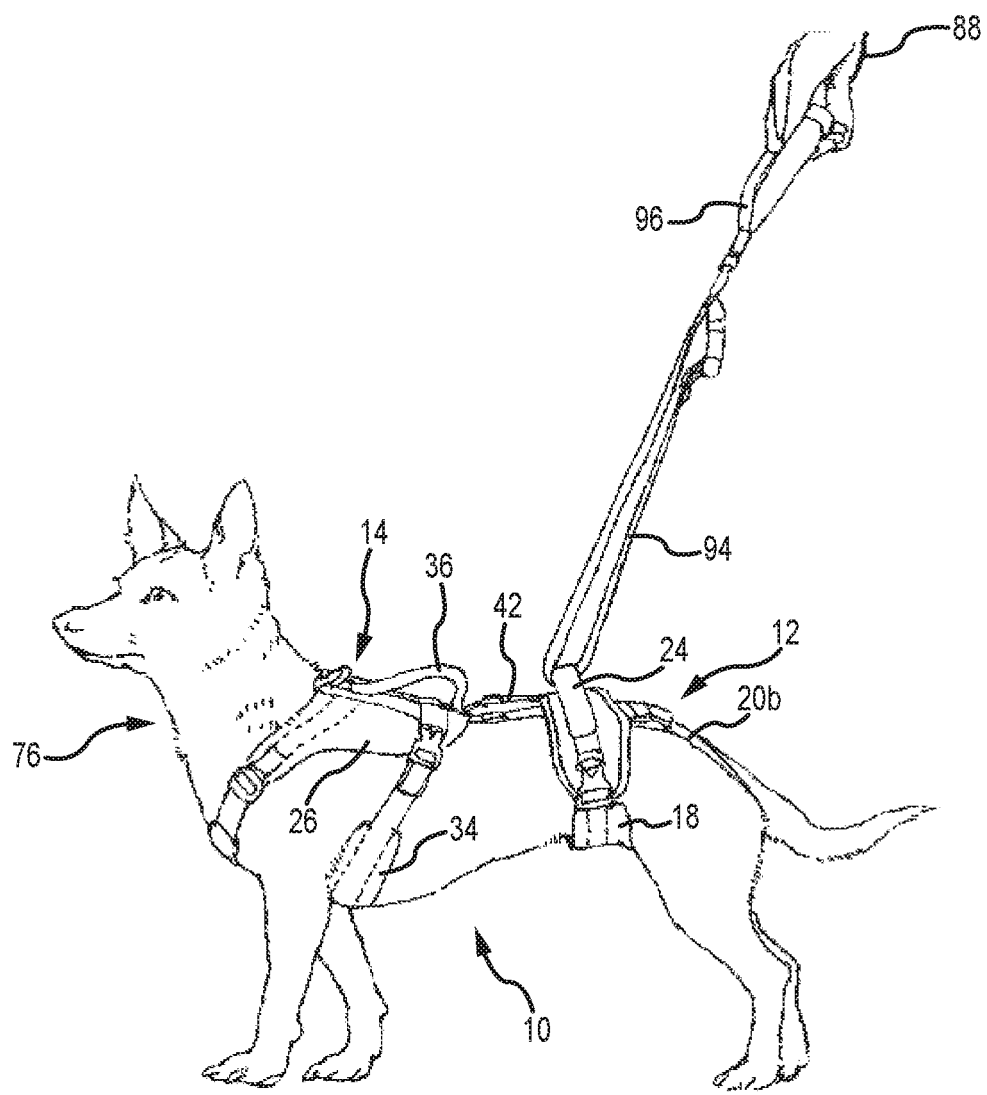
FIG. 9 is a side elevation view of a harness in a state of use and according to one embodiment of the present invention.

FIG. 8 is a side elevation view of the tether 78 wherein the tether 78 comprises a shoulder pad 92. As shown in FIG. 9, the tether 78 with shoulder pad 92 may be particularly useful for larger animals, which may be supported by a user. The pad 92 is provided with the handle 84 disposed thereon, such that the tether 78 in the extended position of FIG. 8 may be used as a shoulder strap, or the tether 78 may be shortened and operate as the hand-held support device as shown in FIG. 7.

FIG. 9 is a side perspective view of an alternative embodiment of a tether 94. As shown, the tether 94 is interconnected to a handle 24 of the rear portion 12 of the device 10. The tether 94 comprises a selectively securable and adjustable strap that enables a user to grasp the tether 94 and support a rear or hind portion of an animal. The tether 94 is particularly well suited for assisting older and/or mobility impaired animals in urination and defecation. Additionally, embodiments of the present invention are suitable for aiding animals that have only three legs. Animals comprising three legs, as may be the result of cancer, injury, etc., are typically mobile and self-sufficient, but also may require assistance due to age or when longer periods of standing and/or walking are required.

The tether 94 comprises a handle 96 which allows a user 88 to grasp, support, and guide the animal 76. Such a tether 94 and associated handle 96 are particularly useful in operations and situations wherein the animal 76 may require assistance with performing bodily functions, or generally require support at the animal's rear end. The tether and handle 96 are pivotable with respect to the animal 76 and allow for ergonomic support of the animal in various positions and orientations.

While the present invention has been illustrated by description of preferred embodiments and while the illustrative versions have been described in considerable detail, it is not the intention of the inventors to restrict or in any way limit the scope of the appended claims to such detail. Additional advantages and modifications will readily appear to those skilled in the art upon reading this detailed description. Therefore, the invention, in its broader aspects, is not limited to these specific details, respective apparatus and methods, and illustrative examples shown and described. Accordingly, departures may be made from such details without departing from the spirit or scope of the inventor's general inventive concepts.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A lifting harness for an animal, comprising:
a chest unit having an upper portion constructed as a first T-shaped member, a chest pad operably engaged with the upper portion, an adjustable strap operably engaged with the upper portion, and a cross member operably engaged with the adjustable strap forming a second T-shaped member, wherein the second T-shape member is opposite to the first T-shape member;
a hip unit having an upper section, a first adjustable strap extending from the upper section, and a second adjustable strap extending from the upper section;
a removable padded securing strap provided to secure the first and second adjustable straps of the hip unit, wherein the removable padded securing strap comprises a padded member that retains the first and second adjustable straps in a substantially fixed proximal position relative to each other and to prevent the first and second adjustable straps from splaying or spreading apart, and wherein the removable padded securing strap forms a tube with a longitudinal axis oriented in the same direction as the first and second adjustable straps; and a tether having a first end and a second end, wherein the tether is operably engaged with the chest unit and is operably engaged with the hip unit, and the tether has an adjustable length between the first and second ends.

2. The lifting harness of claim 1, wherein the upper portion has a handle adapted to receive the hand of a human.

3. The lifting harness of claim 1, wherein the first end of the tether is selectively connectable to the chest unit, and the second end of the tether is selectively connectable to the hip unit.

4. The lifting harness of claim 1, wherein the chest pad is operably engaged with the upper portion via an adjustable chest strap.

5. The lifting harness of claim 1, wherein the first adjustable strap and the second adjustable strap each have two ends, and a position of the removable padded securing strap is fully adjustable between the ends of the first and second adjustable straps.

6. The lifting harness of claim 1, wherein the removable padded securing strap comprises a hook and loop closure, wherein the hook and loop closure is configured to ensure the removable padded securing strap to be passed, encircled or wrapped around the first and second adjustable straps.

7. The lifting harness of claim 1, wherein each of the first and second adjustable straps is secured to the upper section of the hip unit via a securing mechanism, and wherein the securing mechanism is one of a d-ring, a latch, a button, a hook and loop material, a buckle, or a snap fastener.

8. The lifting harness of claim 1, wherein the upper portion comprises a shoulder pad.

9. A lifting harness for an animal, comprising:
a chest unit having a chest pad and having at least one strap adapted to span at least part of an animal, wherein the chest unit has a first handle adapted to receive the hand of a human, and the first handle is oriented along a longitudinal direction of the lifting harness;
a hip unit having an upper section and having a padded sling adapted to span at least part of the animal, wherein at least one of a first end or a second end of the padded sling is selectively connected to the upper section, and the padded sling has an adjustable length between the first and second ends of the padded sling, and wherein the hip unit has a second handle, and the second handle is oriented along a lateral direction of the lifting harness and proximately perpendicular to the first handle; and
a tether having a first end and a second end, wherein the tether is operably engaged with the chest unit and is operably engaged with the hip unit, and the tether has an adjustable length between the first and second ends of the tether to adjust a distance between the chest unit and the hip unit.

10. The lifting harness of claim 9, wherein the hip unit has a U-shaped member proximal a central portion of the padded sling and connecting two portions of the padded sling, and wherein an open portion of the U-shaped member faces toward a rear of the animal.

11. The lifting harness of claim 9, wherein the chest unit has an upper portion, and the at least one strap is selectively connected to the upper portion.

12. The lifting harness of claim 9, wherein at least one of the chest unit or the hip unit has a restraint connector, and the restraint connector is one of a d-ring, a latch, a button, a hook and loop material, a buckle, or a snap fastener.

13. The lifting harness of claim 9, further comprising:
a first adjustable strap extending from the upper section, and a second adjustable strap extending from the upper section; and
a removable padded securing strap provided to secure the first and second adjustable straps of the hip unit, wherein the removable padded securing strap comprises a padded member that retains the first and second adjustable straps in a substantially fixed proximal position relative to each other and to prevent the first and second adjustable straps from splaying or spreading apart, and wherein the removable padded securing strap forms a tube with a longitudinal axis oriented in the same direction as the first and second adjustable straps.

14. The lifting harness of claim 13, wherein the first adjustable strap and the second adjustable strap each have two ends, and a position of the removable padded securing strap is fully adjustable between the ends of the first and second adjustable straps.

15. The lifting harness of claim 13, wherein the removable padded securing strap comprises a hook and loop closure such that the removable padded securing strap is configured to be passed, encircled or wrapped around the first and second adjustable straps.

16. A lifting harness for an animal, comprising:
a hip unit having an upper section, a first adjustable strap extending from the upper section, and a second adjustable strap extending from the upper section, wherein the hip unit has a U-shaped member proximal a central portion of a padded sling and connecting two portions of the padded sling, and wherein an open portion of the U-shaped member faces toward a rear of the animal;
a removable padded securing strap provided to secure the first and second adjustable straps of the hip unit, wherein the removable padded securing strap comprises a padded member that retains the first and second adjustable straps in a substantially fixed proximal position relative to each other and to prevent the first and second adjustable straps from splaying or spreading apart, and wherein the removable padded securing strap forms a tube with a longitudinal axis oriented in the same direction as the first and second adjustable straps;
wherein the removable padded securing strap comprises a hook and loop closure such that the removable padded securing strap is configured to be passed, encircled or wrapped around the first and second adjustable straps; and
wherein the first adjustable strap and the second adjustable strap each have two ends, and a position of the removable padded securing strap is fully adjustable between the ends of the first and second adjustable straps.

17. The lifting harness of claim 16, further comprising:
a chest unit having an upper portion, a chest pad operably engaged with the upper portion, and an adjustable strap operably engaged with the upper portion; and
a tether having a first end and a second end, wherein the tether is operably engaged with the chest unit and is operably engaged with the hip unit, and the tether has an adjustable length between the first and second ends of the tether to adjust a distance between the chest unit and the hip unit.

18. The lifting harness of claim 17, wherein the upper portion has a handle adapted to receive the hand of a human.

19. The lifting harness of claim 17, wherein a cross member extends between the chest pad and the upper portion.

20. The lifting harness of claim 16, wherein each of the first and second adjustable straps is secured to the upper section of the hip unit via a securing mechanism, and wherein the securing mechanism is one of a d-ring, a latch, a button, a hook and loop material, a buckle, or a snap fastener.

* * * * *